United States Patent Office 2,783,419
Patented Feb. 26, 1957

2,783,419

RECTIFIER

Stanley S. Fry, North Chicago, Ill., assignor to Fansteel Metallurgical Corporation, a corporation of New York No Drawing. Application December 8, 1952,
Serial No. 324,848

6 Claims. (Cl. 317—241)

This invention relates to selenium rectifiers and to the method of making the same, and particularly to the blocking layer and method of forming the same.

As is well known, selenium rectifiers consist of a layer of selenium in crystalline form disposed between a carrier electrode and a counterelectrode. Between the selenium and counterelectrode is a thin blocking or dielectric layer which functions to promote the unilateral conductivity of the selenium. In order to reduce the resistance of the rectifier in the forward or conducting direction, it is essential that the blocking layer be as thin as possible. In practice, blocking layers have thicknesses of the order of $10^{-5}$ cm. Because of the extreme thinness of such blocking layers, the variety of materials suitable for use as blocking layers is limited.

Blocking layers may be formed of such materials as lacquer, resin, and other dielectrics. As a rule, an insulating or dielectric material cannot be used as a blocking layer successfully simply because of its insulation characteristic.

In accordance with the present invention, I have found that a selenium rectifier having a blocking layer formed of a thin film of hydroxyethyl cellulose (glycolcellulose) has highly desirable properties. Hydroxyethyl cellulose has the formula:

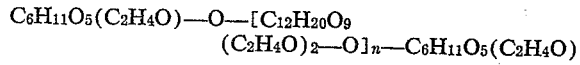

It is commercially available in dry powder form and in the form of aqueous solutions of varying concentrations. In the latter form it is sold by Carbide and Carbon Chemicals Corporation under the trademark "Cellosize." The hydroxyethyl cellulose film exhibits high effective blocking characteristics even when of extreme thinness below about $10^{-5}$ cm., providing the film is continuous and of uniform thickness.

Uniformity of blocking layer thickness is of substantial importance. Thus, an area having an abnormally thick blocking layer will effectively have a higher forward resistance at that point. The result will be that the efficiency of the rectifier will suffer and there will be a tendency for current conduction to occur along the selenium layer rather than through it. This, of course, will further aggravate the operating characteristics of the rectifier and may ultimately suffice to result in hot or burned spots in the rectifier.

In accordance with the present invention, the selenium layer is first coated evenly with a thin film of a water or other completely volatile aqueous solution of hydroxyethyl cellulose. The coating is allowed to dry, preferably at room temperature or at an elevated temperature in the order of about 100 to 200° C., thereby depositing hydroxyethyl cellulose in the form of a transparent, flexible heat-stable, continuous film or layer uniformly over the surface of the selenium.

The hydroxyethyl cellulose solution is applied to the selenium when the selenium is in its conducting, crystalline form and is ready for the application of a counterelectrode. The solution is applied in any desired manner, as by spraying, dipping, etc., to obtain the desired thin coating of liquid. After the continuous layer of hydroxyethyl cellulose has been formed upon the conducting selenium and the layer dried, the counterelectrode may then be applied in any suitable fashion.

The conventional procedure for the manufacture of a selenium cell, apart from the blocking layer, may be followed. Thus, as is well known, the carrier electrode may be of iron, nickel-plated iron, aluminum, or any other metal suitable for the purpose. Customarily, the carrier electrode has one surface suitably scored or roughened so that a selenium layer will have satisfactory adherence. The layer of selenium on the carrier electrode may be obtained in any one of a number of ways. For example, it is customary to dispose a layer of dry amorphous selenium upon the carrier electrode and then to heat the selenium to a temperature of between 125° C. and 150° C. while pressure is applied to produce a thin uniform layer of selenium. It is also customary to flow molten selenium upon the carrier electrode or condense selenium vapors upon the carrier electrode. The selenium layer initially is in the amorphous, non-conducting form. Thereafter, the carrier electrode and layer of amorphous selenium are heat-treated at temperatures of from about 200° C. up to about 220° C. to convert the selenium into the gray, crystalline, conducting form.

After the heat conversion treatment, the selenium is provided with a blocking layer and a counterelectrode is then applied. The art has customarily called for spraying suitable metal over the blocking layer to provide a counterelectrode. Thus, as an example, Woods metal is widely used for spraying to form a counterelectrode. Other metals, such as cadmium, may also be used. It is, of course, well known that the choice of metals for counterelectrodes is limited by the fact that the counterelectrode metal must cooperate with the selenium for proper action.

Finally, the assembled selenium cell is electroformed to impart thereto the desired unilateral conductivity.

As more fully disclosed and claimed in my copending application, Serial No. 291,771, filed June 4, 1952, it is also possible to use a solid sheet of counterelectrode metal and apply the blocking layer to the counterelectrode rather than to the selenium. Thereafter, the counterelectrode with the blocking layer is applied over the selenium layer. It is also possible to apply the counterelectrode and blocking layer over the selenium while the selenium is in its amorphous state, and continue the heat treatment of the selenium with the selenium layer permanently disposed between its electrodes. This is disclosed and claimed in the aforementioned copending application.

The solvent used to make a solution of hydroxyethyl cellulose may be water or other completely volatile aqueous solvent which will not deleteriously affect the selenium, such as mixtures of water and 15% of ethyl alcohol or acetone. The solvent may contain varying amounts of glyoxal or other volatile insolubilizing agent, say 5 to 50%, to impart water resistance to the hydroxyethyl cellulose film. A composition of three parts of hydroxyethyl cellulose and ninety-seven parts of water is an example of a specific solution which has been used successfully to apply the thin, continuous, uniform blocking film or layer of hydroxyethyl cellulose to the selenium. The concentration of the hydroxyethyl cellulose in the solution may be varied widely, from as little as 0.1% to about 20%, depending upon the thickness of film desired.

The solution may be applied by spraying or by dipping or by centrifuging, for example. Centrifuging involves the spinning of the material upon which the solution is applied so that excess liquid will be thrown off. Thus, a disc with carrier electrode and selenium may be rapidly spun while a small quantity of solution is applied at the center. Centrifuging may be used in conjunction with spraying, or after dipping, in order to reduce to a minimum the amount of solution remaining upon the surface of the selenium or carrier electrode.

Blocking layers formed by the above method will produce a thin, continuous blocking layer of uniform thickness, capable of blocking up to 35 volts R. M. S.

I claim:

1. A selenium rectifier comprising a carrier electrode and a counterelectrode on opposite sides of a selenium layer and a blocking layer comprising a thin film of hydroxyethyl cellulose between the selenium layer and the counterelectrode.

2. In the manufacture of a selenium rectifier assembly having a layer of selenium between the carrier electrode and counterelectrode with a blocking layer between the selenium and counterelectrode components, the method of forming the blocking layer which comprises applying a solution consisting essentially of hydroxyethyl cellulose and a completely volatile carrier as a thin film over a surface of one of said components and then drying the film.

3. In the manufacture of a selenium rectifier assembly having a layer of selenium between the carrier electrode and counterelectrode with a blocking layer between the selenium and counterelectrode components, the method of forming the blocking layer which comprises applying a solution consisting essentially of hydroxyethyl cellulose and a completely volatile carrier as a thin film over a surface of the selenium, drying the film and then applying the counterelectrode to the assemby.

4. In the manufacture of a selenium rectifier assembly having a layer of selenium between the carrier electrode and counterelectrode with a blocking layer between the selenium and counterelectrode components, the method of forming the blocking layer which comprises applying a solution consisting essentially of hydroxyethyl cellulose and a completely volatile aqueous carrier as a thin film over a surface of one of said components and then drying the film.

5. In the manufacture of a selenium rectifier assembly having a layer of selenium between the carrier electrode and counterelectrode with a blocking layer between the selenium and counterelectrode components, the method of forming the blocking layer which comprises applying a solution consisting essentially of hydroxyethyl cellulose and a completely volatile aqueous carrier as a thin film over a surface of the selenium, drying the film and then applying the counterelectrode to the assembly.

6. A selenium rectifier comprising a carrier electrode and a counterelectrode on opposite sides of a selenium layer and a blocking layer formed of a thin film of hydroxyethyl cellulose on the surface of the selenium layer adjacent the counterelectrode.

References Cited in the file of this patent

UNITED STATES PATENTS

| 1,914,172 | Schorger | June 13, 1933 |
| 2,446,254 | Amstel | Aug. 3, 1948 |

FOREIGN PATENTS

| 125,810 | Australia | Oct. 16, 1947 |

OTHER REFERENCES

Schorger et al.: Ind. and Eng. Ch. 29 (1937), pp. 114–117.